(12) United States Patent
Mochizuki

(10) Patent No.: US 11,269,248 B2
(45) Date of Patent: Mar. 8, 2022

(54) PROJECTOR AND METHOD FOR CONTROLLING PROJECTOR

(71) Applicant: SEIKO EPSON CORPORATION, Tokyo (JP)

(72) Inventor: Hirotaka Mochizuki, Matsumoto (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 17/024,758

(22) Filed: Sep. 18, 2020

(65) Prior Publication Data
US 2021/0088890 A1 Mar. 25, 2021

(30) Foreign Application Priority Data
Sep. 19, 2019 (JP) .............................. JP2019-170224

(51) Int. Cl.
*G03B 21/20* (2006.01)
*G02B 5/28* (2006.01)

(52) U.S. Cl.
CPC ......... *G03B 21/2073* (2013.01); *G02B 5/284* (2013.01); *G03B 21/204* (2013.01); *G03B 21/2013* (2013.01)

(58) Field of Classification Search
CPC ............ G03B 21/2037; G03B 21/2013; G03B 21/204

USPC .......................................................... 353/20
See application file for complete search history.

(56) References Cited

U.S. PATENT DOCUMENTS

| 2014/0253924 A1* | 9/2014 | Sano ..................... G01J 3/2823 356/456 |
| 2015/0153020 A1 | 6/2015 | Akiyama |

FOREIGN PATENT DOCUMENTS

| JP | 2005-345904 A | 12/2005 |
| JP | 2015-106130 A | 6/2015 |
| JP | 2015-129783 A | 7/2015 |
| JP | 2016-061866 A | 4/2016 |
| JP | 2014188467 | * 4/2016 ............ G03B 21/14 |
| JP | 2018-097143 A | 6/2018 |

* cited by examiner

*Primary Examiner* — Jerry L Brooks
(74) *Attorney, Agent, or Firm* — Dority & Manning, P.A.

(57) ABSTRACT

In a projector, an optical sensor including a wavelength variable interference filter is disposed in the vicinity of the optical path of illumination light that exits out of an illumination system and travels to a color separation system, and the optical sensor detects the amounts of blue light and fluorescence contained in the illumination light. A processor of the projector adjusts the amounts of blue light and fluorescence based on the result of the detection performed by the optical sensor.

10 Claims, 8 Drawing Sheets

PROJECTOR AND METHOD FOR CONTROLLING PROJECTOR

The present application is based on, and claims priority from JP Application Serial Number 2019-170224, filed Sep. 19, 2019, the disclosure of which is hereby incorporated by reference herein in its entirety.

BACKGROUND

1. Technical Field

The present disclosure relates to a projector and a method for controlling the projector.

2. Related Art

In a projector, the brightness or white balance of a projected image changes as the light source deteriorates. As an invention that suppresses a change in the brightness or white balance of an image projected by a projector, there is, for example, a projector disclosed in JP-A-2015-129783. The projector disclosed in JP-A-2015-129783 includes an optical sensor for B light that detects the amount of blue light and an optical sensor for R light that detects the amount of red light and adjusts the white balance of the blue light and the red light in accordance with the results of the detection performed by the optical sensor for B light and the optical sensor for R light. In general, an optical sensor using a color filter that transmits blue light is used as the optical sensor for B light, and an optical sensor using a color filter that transmits red light is used as the optical sensor for R light.

In a projector, however, the wavelength of the light outputted from the light source slightly shifts in some cases when the light source deteriorates with time. The color filter transmittance depends on the wavelength. Therefore, in a projector including light sources that each outputs almost-single-wavelength light, such as laser light sources, and optical sensors each using a color filter, when the light sources deteriorate with time and the wavelength of the light from the light source therefore changes, there is a problem of inaccurate detection of the amounts of blue light and red light.

SUMMARY

A projector according to an aspect of the present disclosure includes a light source section that outputs first light that is laser light and second light that is laser light and has a spectrum different from a spectrum of the first light, a photodetector that includes a wavelength variable interference filter and detects an amount of the first light and an amount of the second light, and a processor that adjusts the amount of the first light outputted by the light source section or the amounts of the first light and the second light outputted by the light source section based on a result of the detection performed by the photodetector.

A projector according to another aspect of the present disclosure includes a light source section that outputs first light and second light. The second light contains third light having a spectrum different from a spectrum of the first light and fourth light having a spectrum different from the spectrum of the first light and the spectrum of the third light. The projector further includes a light separator that separates the first light and the second light outputted from the light source section from each other and separates the separated second light into the third light and the fourth light, a modulator that modulates the first light having been separated by the light separator, the third light having been separated by the light separator, and the fourth light having been separated by the light separator in accordance with a projection image to be projected on a projection surface, a light combiner that combines the first light having been modulated by the modulator, the third light having been modulated by the modulator, and the fourth light having been modulated by the modulator with one another into fifth light, a projection lens that projects the fifth light on the projection surface, a photodetector that includes a wavelength variable interference filter and detects an amount of at least one of the first light, the second light, the third light, or the fourth light, and a processor that adjusts the amount of at least one of the first light, the second light, the third light, or the fourth light based on a result of the detection performed by the photodetector.

A projector controlling method according to another aspect of the present disclosure is a method for controlling a projector that projects an image by using first light that is laser light outputted from a light source and second light that is laser light outputted from the light source and has a spectrum different from a spectrum of the first light, the method including causing an optical sensor including a wavelength variable interference filter to detect an amount of the first light and an amount of the second light and adjusting the amount of the first light outputted or the amounts of the first light and the second light based on a result of the detection.

DESCRIPTION OF EXEMPLARY EMBODIMENTS

Embodiments will be described below with reference to the drawings. In the drawings, the dimension and scale of each portion differ from actual values as appropriate. Further, a variety of technically preferable restrictions are imposed on the embodiments described below, and the embodiments are, however, not limited to the forms described below.

1. First Embodiment

Figure 1:
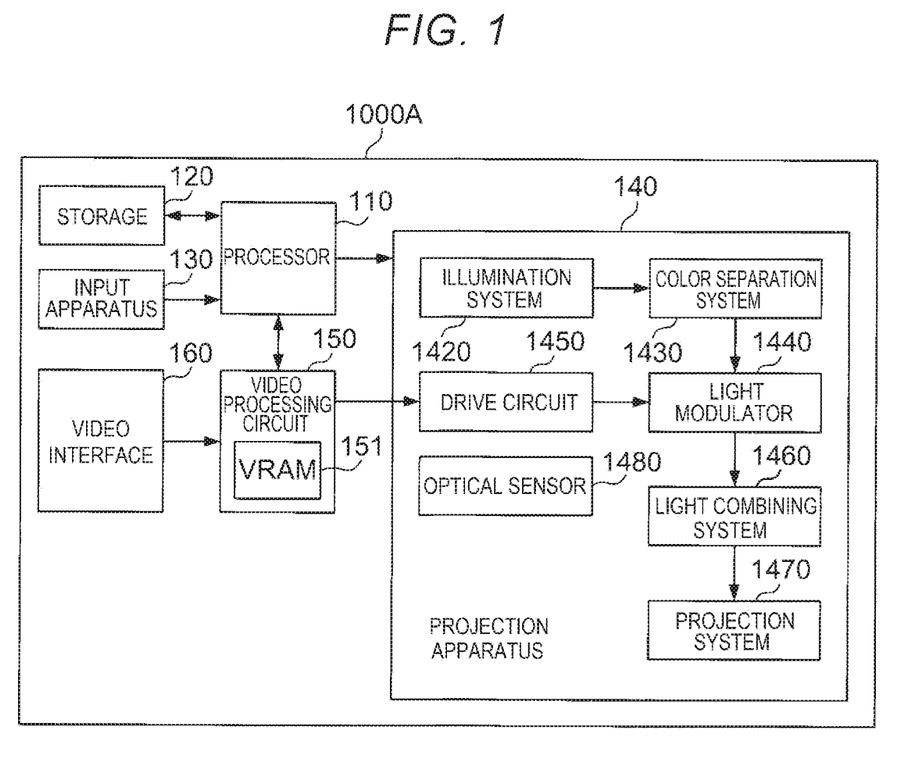
FIG. 1 is a block diagram showing an example of the configuration of a projector according to a first embodiment of the present disclosure.

FIG. 1 is a block diagram showing the configuration of a projector 1000A according to an embodiment of the present disclosure. The projector 1000A projects an image indicated by a video signal supplied from an external apparatus on a projection surface, such as a screen and a wall surface. The image indicated by the video signal supplied from the external apparatus to the projector 1000A is an example of the projection image in the present disclosure.

The projector 1000A includes a processor 110, a storage 120, an input apparatus 130, a projection apparatus 140, a video processing circuit 150, and a video interface 160. The processor 110 is a CPU (central processing unit). When the CPU executes a program stored in the storage 120, the processor 110 controls the portions of the projector 1000A to achieve the function of projecting an image, the function of setting the quality of the projected image, the function of controlling the white balance of the projected image, and other functions.

The video interface 160 includes a plurality of connectors to which a video signal is supplied, such as connectors compliant with RCA, D-Sub, HDMI, USB (universal serial bus), and other standards and supplies the video processing circuit 150 with the video signal supplied from the external apparatus to any of the connectors, HDMI is a registered trademark. The video interface 160 is an example of a video acquirer that acquires a plurality of video signals. The video interface 160 may include a wireless communication interface, such as interfaces compliant with a wireless LAN and Bluetooth, and acquire a video signal over wireless communication. Bluetooth is a registered trademark.

The storage 120 includes a ROM (read only memory) and a RAM (random access memory). The storage 120 stores setting values associated with the quality of a projected image, information on the variety of functions, information to be processed by the processor 110, and other pieces of information. The input apparatus 130 includes a plurality of buttons that allow a user to operate the projector 1000A. The processor 110 controls any of the portions of the projector 1000A in accordance with an operated button to adjust an image projected on a screen SCR, set any of the variety of functions performed by the projector 1000A, or otherwise operate the projector 1000A. The input apparatus 130 includes a light receiver that receives an infrared signal from a remote control. In FIG. 1, the remote control and the light receiver are omitted. The input apparatus 130 converts the signal received from the remote control into an electric signal and supplies the processor 110 with the electric signal as a result of the conversion. The processor 110 controls any of the portions of the projector 1000A in accordance with the electric signal supplied from the input apparatus 130.

The video processing circuit 150 acquires the video signal supplied from the video interface 160. The video processing circuit 150 further acquires an on-screen image signal for operating the projector 1000A, such as a GUI signal, from the processor 110. The video processing circuit 150 includes a VRAM (video RAM) 151. The VRAM 151 has a first region where the video signal is developed and a second region where the on-screen image signal is developed. The video processing circuit 150 develops the video signal supplied from the video interface 160 in the first region and develops the on-screen image signal acquired from the processor 110 in the second region. The video processing circuit 150 has a variety of image processing functions. The video processing circuit 150 performs image processing on the video image having been developed in the first region of the VRAM 151. The image processing adjusts the quality of the projected image. When the processor 110 supplies the video processing circuit 150 with the on-screen image signal, the video processing circuit 150 supplies the projection apparatus 140 with a video signal on which the on-screen image signal has been superimposed.

The projection apparatus 140, which projects an image, includes an illumination system 1420, a color separation system 1430, a light modulation device 1440, a drive circuit 1450, a light combining system 1460, a projection system 1470, and an optical sense 1480.

Figure 2:
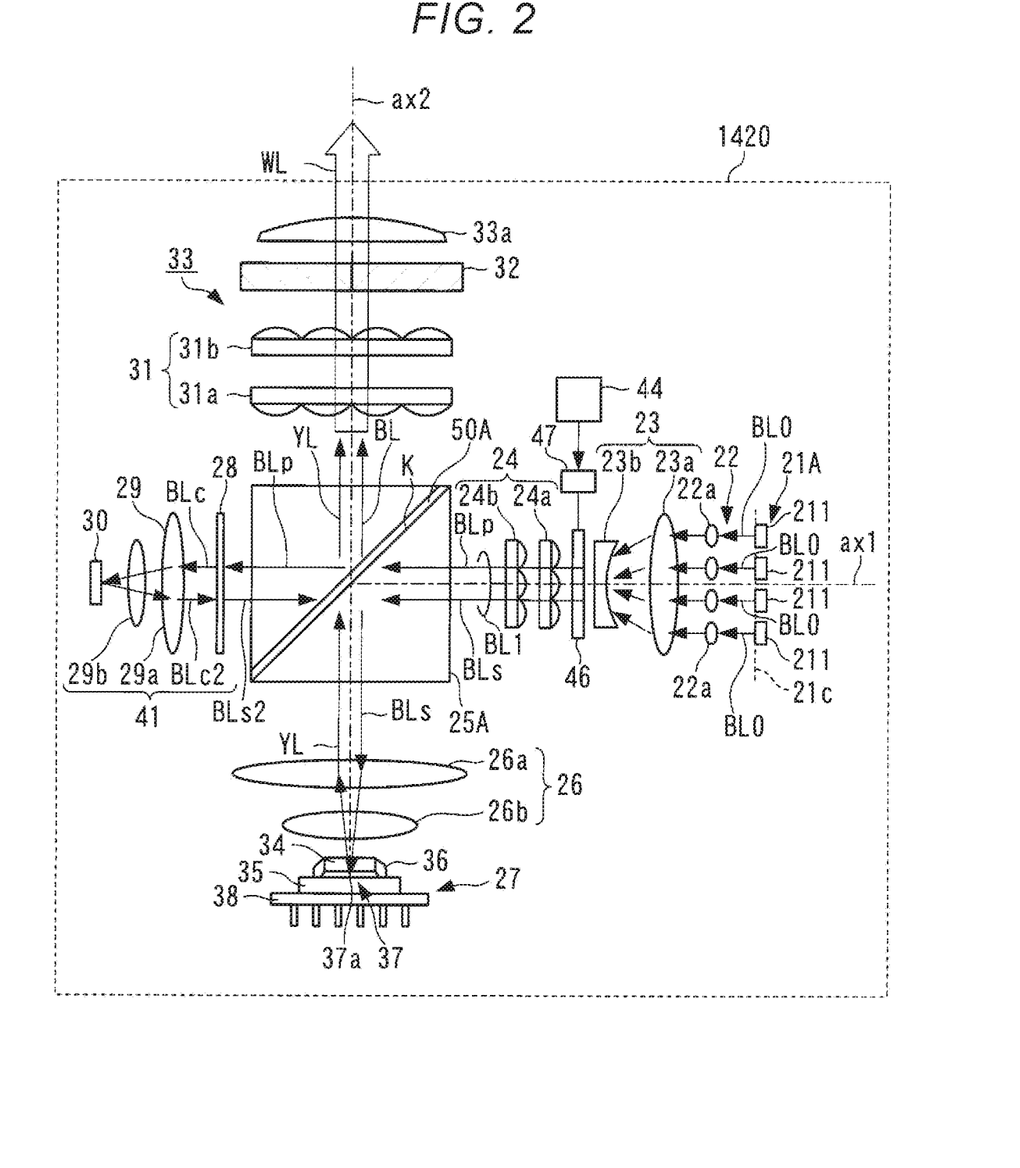
FIG. 2 shows an example of the configuration of n illumination system provided in the projector.

FIG. 2 shows an example of the configuration of the illumination system 1420. The illumination system 1420 includes an array light source 21A, a collimator system 22, an afocal system 23, a retardation film 46, a motor 47, a homogenizer system 24, a prism 25A including a polarization separator 50A, a pickup system 26, a light emitter 27, an optical element 41, a diffusive reflector 30, an optical integration system 31, a polarization converter 32, a superimposing system 33, and a controller 44, as shown in FIG. 2.

The array light source 21A, the collimator system 22, the afocal system 23, the homogenizer system 24, the prism 25A, a retardation film 28, a second pickup system 29, and the diffusive reflector 30 are so arranged along an optical axis ax1 that the optical centers of the components described above coincide with the optical axis ax1 shown in FIG. 2. On the other hand, the light emitter 27, the pickup system 26, the prism 25A, the optical integration system 31, the polarization converter 32, and a superimposing lens 33a are so arranged along an optical axis ax2 shown in FIG. 2 that the optical centers of the components described above coincide with the optical axis ax2. The optical axes ax1 and ax2 are perpendicular to each other.

The array light source 21A includes a plurality of semiconductor lasers 211. The plurality of semiconductor lasers 211 are arranged in an array in a plane 21c perpendicular to the optical axis ax1. The number of semiconductor lasers 211 is not limited to a specific number. The semiconductor lasers 211 each output S-polarized blue light BL0. The semiconductor lasers 211 are an example of a solid-state light source in the present disclosure. Blue light BL is an example of the first light. The blue light BL0 outputted from each of the semiconductor lasers 211 is an example S-polarized first light having a first polarization axis. In the present embodiment, the blue light BL0 outputted by each of the semiconductor lasers 211 has a full width at half maximum of 30 nm or smaller. The blue light BL0 is outputted from the array light source 21A toward the collimator system 22.

Figure 4:
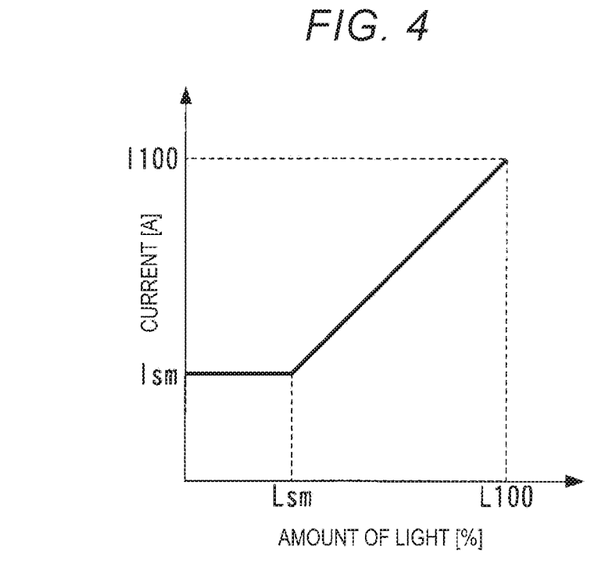
FIG. 4 shows an example of the content stored in a current table.
Figure 5:
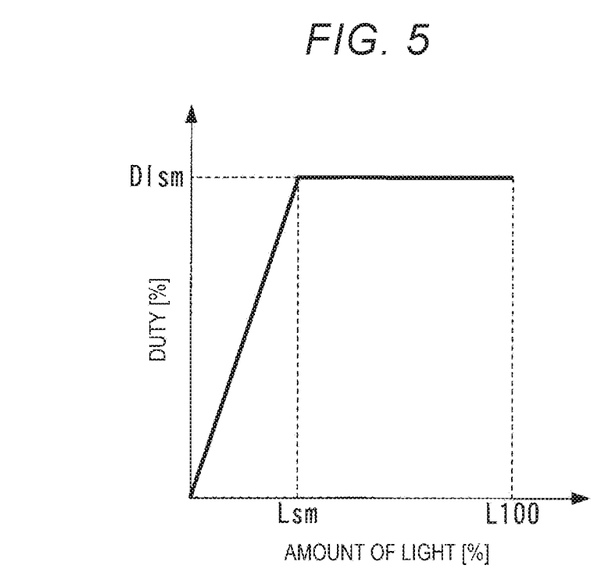
FIG. 5 shows an example of the content stored in a duty table.

In the present embodiment, the array light source 21A is driven based on constant current or a PWM signal. FIG. 4 shows an example of the content stored in a current table referred to when the array light source 21A is driven based on constant current, and FIG. 5 shows an example of the content stored in a duty table referred to when the array light source 21A is driven based on the PWM signal. The current table and the duty table are stored in the storage 120.

The content stored in the current table shows the relationship between the drive current and the amount of light when the array light source 21A is driven based on constant current. The amount of light is expressed in the form of a relative value with respect to an amount of light L100, which is the amount of light produced when the array light source 21A is driven by current I100, which is constant current and is set in advance at the time of shipment of the projector 1000A or exchange of the array light source 21A. In the present embodiment, the amount of light is expressed in the form of the percentage with respect to the amount of light L100. Current Ism is a current value set as lower-limit current that allows light emission even when the array light source 21A changes in accordance with deterioration of the array light source 21A with time or the environment in which the projector 1000A is used.

The content stored in the current table in the present embodiment shows that the current increases in accordance with an increase in the amount of light in the region where the amount of light is greater than or equal to Lsm, and that the current has the same current value irrespective of the amount of light in the region where the amount of light is smaller than Lsm, as shown in FIG. 4. The current value that changes in accordance with a change in the amount of light can be derived in the region where the amount of light is greater than or equal to Lsm by referring to the content stored in the current table. The current Ism can be derived irrespective of the amount of light in the region where the amount of light is smaller than Lsm.

The content stored in the duty table shows the relationship between the amount of light and the duty of the PWM signal when the array light source 21A is driven based on the PWM signal. Since the array light source 21A is driven based on constant current in accordance with the content stored in the current table in the region where the amount of light is greater than or equal to Lsm, the content stored in the duty table shows 100% duty in the region where the amount of light is greater than or equal to Lsm, as shown in FIG. 5. In contrast, the content stored in the duty table shows that the duty of the PWM signal changes from 0 to 100% in accordance with a change in the amount of light from 0 to Lsm in the region where the amount of light is smaller than Lsm. A duty Dlsm corresponding to the amount of light Lsm can be derived irrespective of the amount of light in the region where the amount of light is greater than or equal to Lsm by referring to the content stored in the duty table. In the present embodiment, the duty Dlsm is 100%. The duty corresponding to the amount of light can be derived in the region where the amount of light is smaller than Lsm by referring to the duty table.

The blue light BL0 outputted from the array light source 21A enters the collimator system 22, as shown in FIG. 2. The collimator system 22 converts the blue light BL0 outputted from the array light source 21A into a parallelized light flux. The collimator system 22 is formed, for example, of a plurality of collimator lenses 22a arranged in an array. The plurality of collimator lenses 22a are arranged in correspondence with the plurality of semiconductor lasers 211.

The blue light BL0 converted into the parallelized light flux when passing through the collimator system 22 enters the afocal system 23. The afocal system 23 adjusts the light flux diameter of the blue light BL0. The afocal system 23 is formed, for example, of an afocal lens 23a and an afocal lens 23b.

The blue light BL0 having passed through the afocal system 23 and therefore having the adjusted light flux diameter enters the homogenizer system 24. The homogenizer system 24 converts the optical intensity distribution of the blue light BL0 into, for example, a uniform optical intensity distribution called a top-hat distribution. The homogenizer system 24 is formed, for example, of a multi-lens array 24a and a multi-lens array 24b.

The retardation film 46 is provided between the afocal system 23 and the homogenizer system 24, more specifically, between the afocal lens 23b and the multi-lens array 24a. The retardation film 46 is rotatably provided in a plane on which the blue light BL0 is incident. The retardation film 46 is formed of a half wave plate associated with the wavelength of the blue light BL0. The optical axis of the retardation film 46 intersects the polarization axis of the blue light BL0 that enters the retardation film 46. The optical axis of the retardation film 46 may be the fast axis or the slow axis of the retardation film 46. The motor 47, which rotates the retardation film 46, is coupled to the retardation film 46. The motor 47 rotates the retardation film 46 under the control of the controller 44. The controller 44 is a circuit that supplies the motor 47 with operating electric power. The controller 44 controls the electric power to be supplied to the motor 47 under the control of the processor 110. The electric power control controls the operation of driving the motor 47.

The blue light BL0 is coherent S-polarized light. The blue light BL0 is initially S-polarized light, and the polarization axis of the blue light BL0 intersects the optical axis of the retardation film 46. Therefore, when the blue light BL0 passes through the retardation film 46, part of the S-polarized light is converted into P-polarized light. As a result, blue light BL1, which is the blue light BL0 having passed through the retardation film 46, is light containing an S-polarized component BLs and a P-polarized component BLp mixed with each other at a predetermined ratio. The P-polarized component BLp is an example of P-polarized first light, and the polarization axis of the P-polarized component BLp is an example of a second polarization axis that intersects the first polarization axis.

The blue light BL1 having exited out of the homogenizer system 24 enters the prism 25A. The prism 25A is formed, for example, of a dichroic prism having wavelength selectivity. The dichroic prism has an inclining surface K, which inclines by 45° with respect to the optical axis ax1. The inclining surface K also inclines by 45° with respect to the optical axis ax2. The prism 25A is so disposed that the intersection of the optical axes ax1 and ax2, which are perpendicular to each other, coincides with the optical center of the including surface K. The prism 25 formed of a dichroic prism may be replaced with a planar-plate-shaped dichroic mirror having surfaces parallel to each other.

The polarization separator 50A having wavelength selectivity is provided on the inclining surface K. The polarization separator 50A has a polarization separation function of separating the blue light BL1 into the S-polarized component BLs and the P-polarized component BLp with respect to the polarization separator 50A. Specifically, the polarization separator 50A reflects the S-polarized component BLs and transmits the P-polarized component BLp. In the following description, the S-polarized component BLs reflected off the polarization separator 50A is used to excite a phosphor layer and is therefore called excitation light in the following description. The P-polarized component BLp having passed through the polarization separator 50A is used as illumination light.

The polarization separator 50A also has a color separation function of transmitting yellow fluorescence YL, which belongs to a wavelength band different from the wavelength band to which the blue light BL0 outputted from the semiconductor lasers 211 belongs, irrespective of the polarization state of the fluorescence YL.

The excitation light having exited out of the polarization separator 50A enters the pickup system 26. The pickup system 26 causes the excitation light to diverge toward a phosphor layer 34 of the light emitter 27. The pickup system 26 is formed, for example, of a pickup lens 26a and a pickup lens 26b.

The excitation light having exited out of the pickup system 26 enters the light emitter 27. The light emitter 27 includes the phosphor layer 34, which is an example of a phosphor in the present disclosure, and a substrate 35, which supports the phosphor layer 34. When the excitation light enters the phosphor layer 34, the phosphor contained in the phosphor layer 34 is excited with the excitation light and produces the yellow fluorescence YL having a wavelength different from the wavelength of the excitation light. The fluorescence YL is an example of the second light having a spectrum different from the spectrum of the first light, and the light emitter 27 is an example of a wavelength converter that produces the second light based on the first light.

In the light emitter 27, the phosphor layer 34 is fixed to the substrate 35 via an adhesive 36, which is provided between the side surface of the phosphor layer 34 and the substrate 35, with a surface of the phosphor layer 34 that is the surface opposite the side on which the excitation light is incident being in contact with the substrate 35. A heat sink 38, which dissipates heat from the phosphor layer 34, is provided on a surface of the substrate 35 that is the surface opposite the side on which the phosphor layer 34 is provided.

The fluorescence YL emitted from the phosphor layer 34 is nonpolarized light having polarization directions that are not aligned with one another. Therefore, after passing through the pickup system 26, the fluorescence YL that is still nonpolarized light enters the polarization separator 50A. The fluorescence YL passes through the polarization separator 50A and travels toward the optical integration system 31.

On the other hand, the P-polarized component BLp having passed through the polarization separator 50A enters the optical element 41. The optical element 41 includes the retardation film 28, the second pickup system 29, and the diffusive reflector 30. The P-polarized component BLp enters the retardation film 28. The retardation film 28 is formed of a quarter wave plate disposed in the optical path between the polarization separator 50A and the diffusive reflector 30. The P-polarized component BLp is converted by the retardation film 28 into circularly polarized blue light BLc, and the converted blue light BLc enters the second pickup system 29.

The second pickup system 29 causes the circularly polarized blue light BLc to converge toward the diffusive reflector 30. The second pickup system 29 is formed, for example, of a pickup lens 29a and a pickup lens 29b.

The diffusive reflector 30 diffusively reflects the circularly polarized blue light BLc having exited out of the second pickup system 29 toward the polarization separator 50A. In particular, the diffusive reflector 30 preferably reflects the circularly polarized blue light BLc incident on the diffusive reflection element 30 in a Lambertian reflection scheme. In the illumination system 1420, using the thus configured diffusive reflection element 30 allows diffusive reflection of the circularly polarized blue light BLc to produce circularly polarized blue light BLc2 having a uniform illuminance distribution.

The circularly polarized blue light BLc2 diffusively reflected off the diffusive reflector 30 enters the retardation film 28 again, which converts the circularly polarized blue light BLc2 into S-polarized blue light BL. The S-polarized blue light therefore exits out of the optical element 41. The S-polarized blue light BL enters the polarization separator 50A. The S-polarized blue light BL is reflected off the polarization separator 50A and travels toward the optical integration system 31.

The blue light BL is thus used along with the fluorescence YL having passed through the polarization separator 50A as the illumination light WL. That is, the blue light BL and the fluorescence YL exit out of the polarization separator 50A in the same direction. The blue light BL and yellow fluorescence YL are thus combined with each other into the white illumination light WL. That is, the polarization separator 50A also functions as a light combiner that combines the blue light BL and the fluorescence YL with each other.

The illumination light WL having exited out of the polarization separator 50A enters the optical integration system 31. The optical integration system 31 divides the illumination light WL into a plurality of narrow light fluxes. The optical integration system 31 is formed, for example, of a first lens array 31a and a second lens array 31b. The first lens array 31a and the second lens array 31b are each formed of a plurality of microlenses arranged in an array.

The illumination light WL having exited out of the optical integration system 31 enters the polarization converter 32. The polarization converter 32 aligns the polarization directions of the illumination light WL with one another. The polarization converter 32 is formed, for example, of polarization separation films, retardation films, and mirrors. To align the polarization directions of the fluorescence YL with the polarization direction of the S-polarized blue light BL, the polarization converter 32 converts one of the polarized components into the other, for example, the P-polarized component into the S-polarized component.

The illumination light WL having passed through the polarization converter 32 and therefore having the aligned polarization direction enters the superimposing lens 33a. The superimposing lens 33a superimposes the plurality of narrow light fluxes having exited out of the polarization converter 32 on one another on as illumination target. The illumination target is therefore uniformly illuminated with the illumination light WL having exited out of the superimposing lens 33a. The superimposing system 33 is formed of the optical integration system 31 the superimposing lens 33a. The illumination light WL having exited out of the superimposing lens 33a enters the color separation system 1430, as shown in FIGS. 1 and 2. The illumination light WL having exited out of the illumination system 1420 and traveling to the color separation system 1430 contains the first light and the second light. The illumination system 1420 is an example of the light source section that outputs the first light and the second light.

Figure 3:
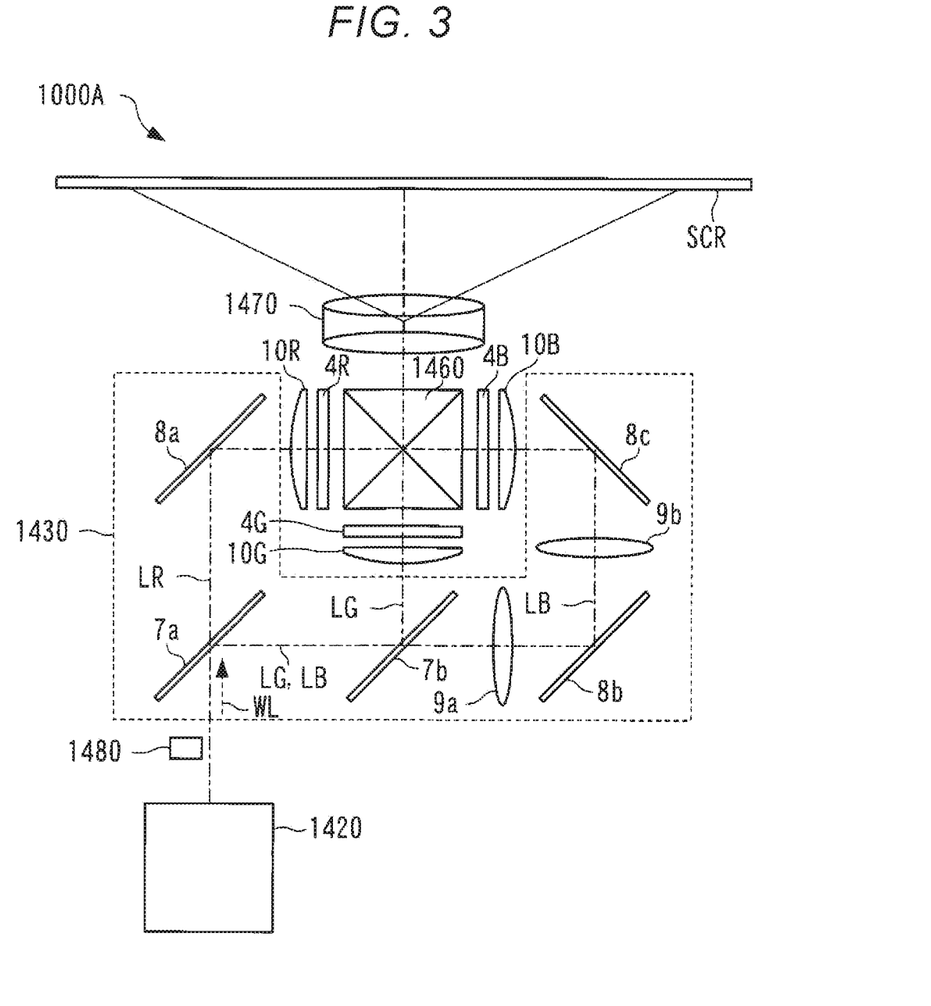
FIG. 3 shows an example of the configuration of a color separation system provided in the projector and further shows an example of the position where an optical sensor is disposed in the projector.

FIG. 3 shows an example of the configuration of the color separation system 1430. The color separation system 1430 includes a first dichroic mirror 7a, a second dichroic mirror 7b, a first reflection mirror 8a, a second reflection mirror 8b, a third reflection mirror 8c, a first relay lens 9a, and a second relay lens 9b. The color separation system 1430 separates the illumination light WL having exited out of the illumination system 1420 into red light LR, green light LG, and blue light LB. The green light LG is an example of the third light having a spectrum different from the spectrum of the first light. The red light LR is an example of the fourth light having a spectrum different from the spectra of the first light and the third light. The color separation system 1430 is an example of the light separator that separates the first light and the second light from the illumination light WL and separates the third light and the fourth light from the separated second light.

The first dichroic mirror 7a has the function of separating the illumination light WL having exited out of the illumination system 1420 into the red light LR and the combination of the green light LG and the blue light LB. The first dichroic mirror 7a transmits the red light LR and reflects the green light LG and the blue light LB. The second dichroic mirror 7b has the function of separating the light reflected off the first dichroic mirror 7a into the green light LG and the blue light LB. The second dichroic mirror 7b reflects the green light LG and transmits the blue light LB.

The first reflection mirror 8a is disposed in the optical path of the red light LR. The first reflection mirror 8a reflects the red light LR having passed through the first dichroic mirror 7a toward a light modulator for red light 4R. The second reflection mirror 8b and the third reflection mirror 8c are disposed in the optical path of the blue light LB. The second reflection mirror 8b and the third reflection mirror 8c reflect the blue light LB having passed through the second dichroic mirror 7b toward a light modulator for blue light 4B. The green light LG is reflected off the second dichroic mirror 7b and travels toward a light modulator for green light 4G.

The first relay lens 9a and the second relay lens 9b are disposed in the optical path of the blue light LB on the light exiting side of the second dichroic mirror 7b. The first relay lens 9a and the second relay lens 9b have the function of compensating optical loss of the blue light LB resulting from the fact that the optical path length of the blue light LB is longer than the optical path lengths of the red light LR and the green light LG.

The light modulator for red light 4R, the light modulator for green light 4G, and the light modulator for blue light 4B are each a light modulator provided in the light modulator 1440. The drive circuit 1450 controls the light modulator for red light 4R, the light modulator for green light 4G, and the light modulator for blue light 4B in accordance with the video signal supplied from the video processing circuit 150.

The light modulator for red light 4R modulates the red light LR under the control of the drive circuit 1450 to form image light corresponding to the red light LR. The light modulator for green light 4G modulates the green light LG under the control of the drive circuit 1450 to form image light corresponding to the green light LG. The light modulator for blue light 4B modulates the blue light LB under the control of the drive circuit 1450 to form image light corresponding to the blue light LB. The video signal supplied from the video processing circuit 150 is an example of image information representing a projection image. The light modulator for blue light 4B is an example of a first light modulation section that transmits the first light in accordance with the image information representing the projection image. The light modulator for green light 4G is an example of a third light modulation section that transmits the third light in accordance with the image information representing the projection image. The light modulator for red light 4R is an example of a fourth light modulation section that transmits the fourth light in accordance with the image information representing the projection image. The light modulator 1440 is an example of the modulation section that modulates the first light having been separated by the color separation system 1430, the third light having been separated by the color separation system 1430, and the fourth light having been separated by the color separation system 1430 in accordance with the projection image to be projected on the projection surface.

The light modulator for red light 4R, the light modulator for green light 4G, and the light modulator for blue light 4B are each, for example, a transmissive liquid crystal panel. A pair of polarizers that are not shown are disposed on the light incident side and the light exiting side of each of the liquid crystal panels. The pair of polarizers transmit linearly polarized light polarized in a specific direction.

A field lens 10R is disposed on the light incident side of the light modulator for red light 4R. A field lens 10G is disposed on the light incident side of the light modulator for green light 4G. A field lens 10B is disposed on the light incident side of the light modulator for blue light 4B. The field lens 10R parallelizes the red light LR to be incident on the light modulator for red light 4R. The field lens 10G parallelizes the green light LG to be incident on the light modulator for green light 4G. The field lens 10B parallelizes the blue light LB to be incident on the light modulator for blue light 4B.

The light combining system 1460 combines the image light corresponding to the red light LR, the image light corresponding to the green light LG, and the image light corresponding to the blue light LB with one another and causes the combined image light to exit toward the projection system 1470. The light combining system 1460 is formed, for example, of a cross dichroic prism. The combined image light from the light combining system 1460 is an example of the fifth light, and the light combining system 1460 is an example of the light combiner that combines the first light having been modulated by the modulation section, the third light having been modulated by the modulation section, and the fourth light having been modulated by the modulation section with one another into the fifth light.

The projection system 1470 is formed of a projection lens group including a plurality of projection lenses. The projection system 1470 enlarges the combined image light from the light combining system 1460 and projects the enlarged image light toward the screen SCR. An enlarged color image is thus displayed on the screen SCR. The screen SCR is an example of the projection surface in the present disclosure. The projection system 1470 is an example of the projection section that projects the fifth light as a result of the combination operation performed by the light combining system 1460 on the projection surface.

The optical sensor 1480 is disposed in the vicinity of the optical path of the illumination light WL having exited out of the illumination system 1420 and traveling to the color separation system 1430, as shown in FIG. 3. The optical path of the illumination light WL having exited out of the illumination system 1420 and traveling to the color separation system 1430 is an example of a first optical path in the present disclosure. That is, the optical sensor 1480 is disposed in the vicinity of the first optical path. Although not shown in detail in FIG. 3, a reflector that reflects part of the illumination light WL and causes the reflected illumination light WL to enter the optical sensor 1480 is disposed in the optical path of the illumination light WL having exited out of the illumination system 1420 and traveling to the color separation system 1430 in a position where the illumination light WL is not brought into focus. The reflector is disposed in a position where the illumination light WL having exited out of the illumination system 1420 and traveling to the color separation system 1430 is not brought into focus and therefore does not greatly affect the image light projected via the projection system 1470 on the screen SCR. The optical sensor 1480 detects the amount of light having a wavelength set by a wavelength setting instruction provided from the processor 110 out of the light contained in the illumination light WL that enters the optical sensor 1480 after reflected off the reflector and outputs a detection signal representing the detected amount of light to the processor 110. In the present embodiment, the wavelength of the blue light BL and the wavelength of the fluorescence YL are each specified by the processor 110 as the wavelength of the light the amount of which is the detection target. In the present embodiment, the optical sensor 1480 is disposed in the vicinity of the first optical path and may instead be disposed in the first optical path. Specifically, the optical sensor 1480 only needs to be disposed in a position where the illumination light WL is not brought into focus in the optical path of the illumination light WL having exited out of the illumination system 1420 travelling to the color separation system 1430, and in this case, no reflector needs to be provided.

Figure 6:
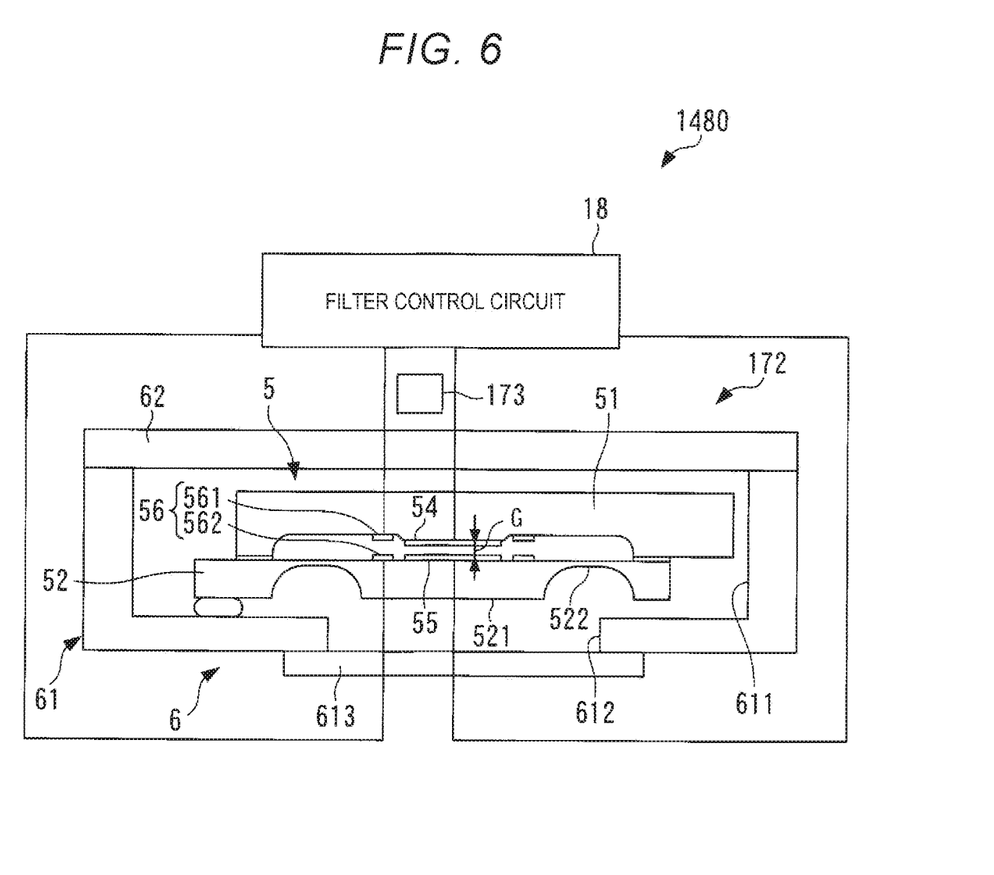
FIG. 6 is a block diagram showing an example of the configuration of an optical sensor.

FIG. 6 shows a schematic configuration of the optical sensor 1480. The optical sensor 1480 includes an optical filter device 172 including a wavelength variable interference filter 5, a light receiver 173, and a filter control circuit 18. In the optical sensor disposed as shown in FIG. 3, the illumination light WL guided by a scatter plate or any other component to the optical sensor 1480 enters the optical filter device 172. The optical filter device 172 transmits the light having the wavelength set by the wavelength setting instruction and causes the light having passed through the optical filter device 172 to be received with the light receiver 173. The light receiver 173 is disposed in the optical axis of the wavelength variable interference filter 5 and receives the light having passed through the wavelength variable interference filter 5. The light receiver 173 outputs a detection signal according to the amount of received light. The detection signal outputted from the light receiver 173 is outputted to the processor 110 via an I-V converter, an amplifier, and an AD converter none of which is shown. The detection of the amounts of light having the wavelengths specified by the processor 110 is thus achieved. The optical sensor 1480 is an example of the photodetector that includes a wavelength variable interference filter and detects the amount of first light and the amount of second light. In the present embodiment, the reason why the optical sensor 1480 including the wavelength variable interference filter 5 is used to detect the amount of blue light BL and the amount of fluorescence YL will be described below.

Figure 7:
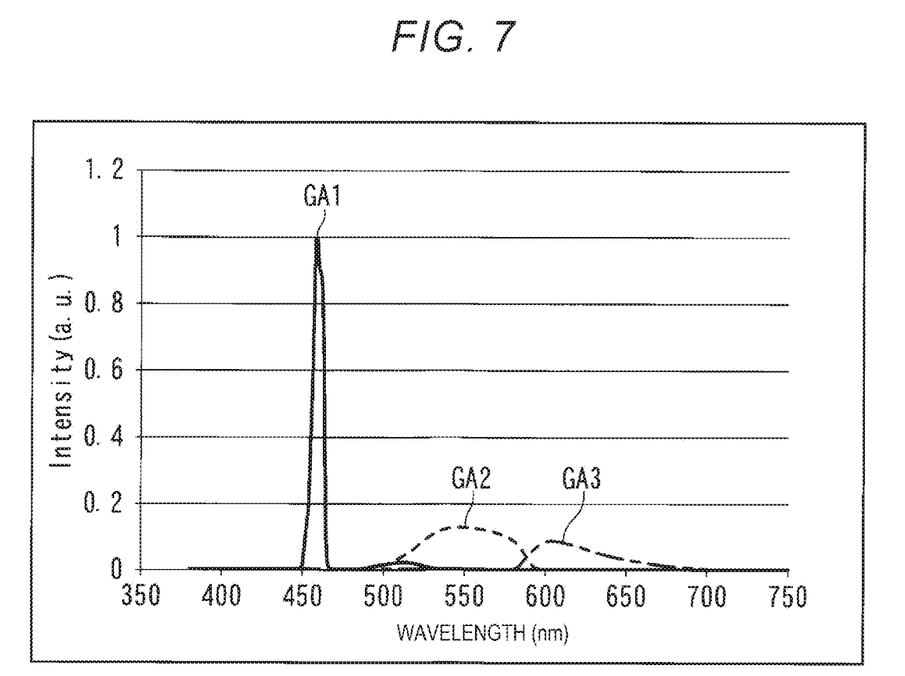
FIG. 7 shows an example of the spectrum of blue light, the spectrum of red light, and the spectrum of green light in the projector.

FIG. 7 shows an example of the spectrum of the blue light LB having exited out of the illumination system 1420, the spectrum of the green light separated from the fluorescence YL having exited out of the illumination system 1420, and the spectrum of the red light separated from the fluorescence YL. In FIG. 7, the reference character GA1 represents the spectrum of the blue light LB, the reference character GA2 represents the spectrum of the green light separated from the fluorescence YL, and the reference character GA3 represents the spectrum of the red light separated from the fluorescence YL. The spectrum GA1 of the blue light LB outputted from the semiconductor lasers 211 has a narrow band, as shown an FIG. 7. The wavelength and energy of the spectrum GA1 of the blue light LB shift when the semiconductor lasers 211 deteriorate or the temperature thereof changes.

Figure 8:
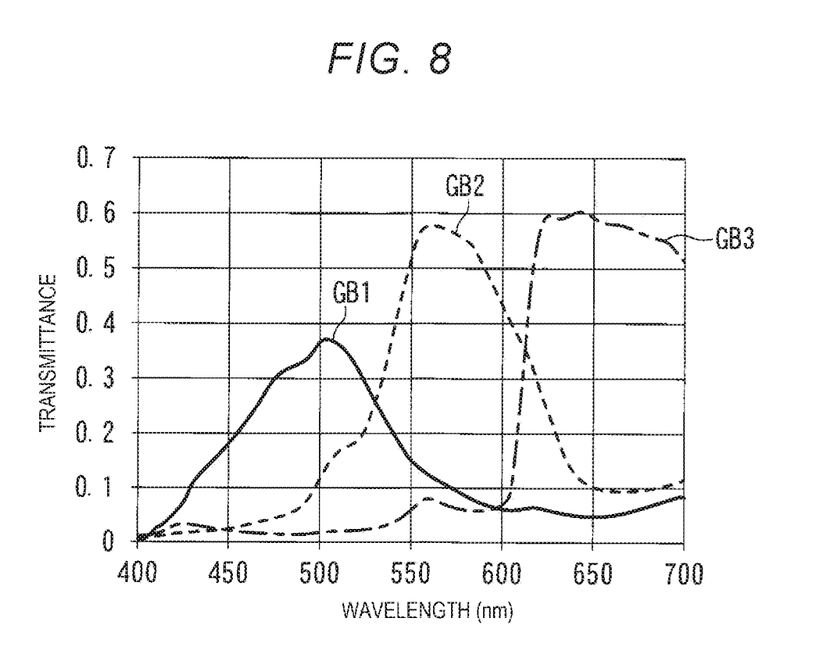
FIG. 8 shows an example of the light transmission characteristics of color filters.

An optical sensor using a color filter cannot accurately detect the amount of light under detection in some cases when the spectrum of the light shifts. The reason for this is that the light transmission characteristic of the color filter, which desirably has a fixed rectangular-shape transmittance in the transmission band, does not in practice have fixed transmittance in the transmission band. FIG. 8 shows an example of the light transmission characteristics of blue, green, and red color filters. The reference character GB1 represents the light transmission characteristic of the blue color filter. The reference character GB2 represents the light transmission characteristic of the green color filter. The reference character GB3 represents the light transmission characteristic of the red color filter. For example, consider a case where optical sensors each including a color filter are used in place of the optical sensor 1480 and the transmittance at which the blue color filter transmits blue light is so set at the time of shipment of the projector 1000A from the factory as to peak at the wavelength of the blue light LB outputted from the semiconductor lasers 211. In this case, when the spectrum of the blue light LB shifts when the semiconductor lasers 211 deteriorate or the temperature thereof changes, the amount of blue light that passes through the blue color filter decreases, so that the optical sensor cannot accurately detect the amount of blue light BL.

Figure 9:
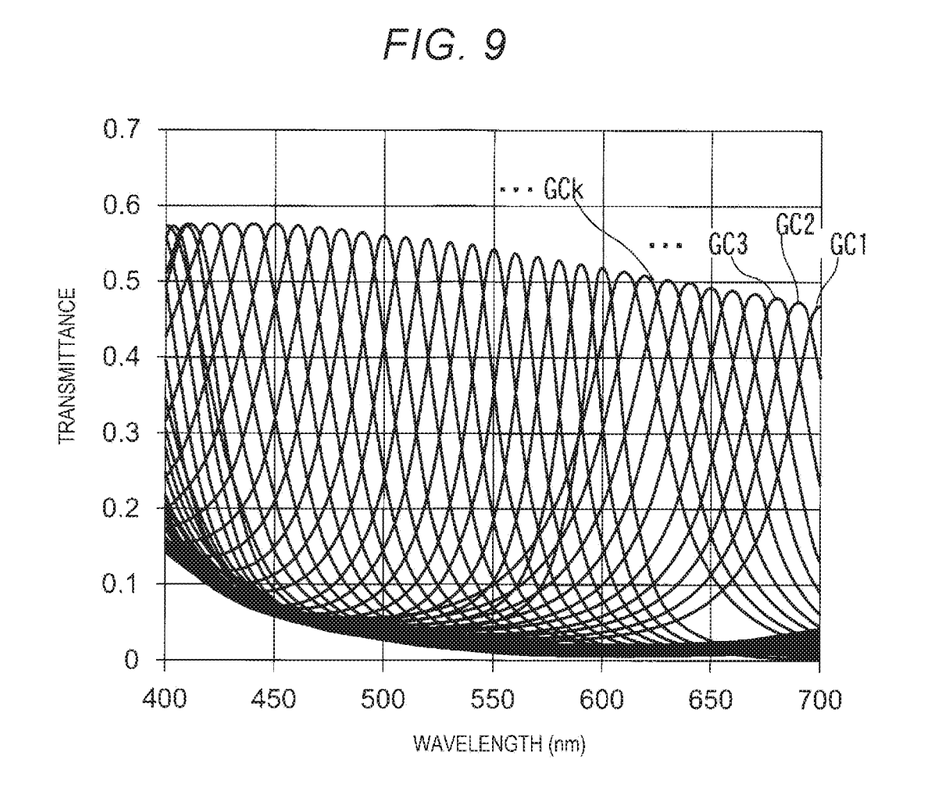
FIG. 9 shows examples of the light transmission characteristic of a wavelength variable interference filter provided in the optical sensor.

FIG. 9 shows examples of the light transmission characteristic of the wavelength variable interference filter 5. The light transmission characteristic of the wavelength variable interference filter 5 changes as follows in accordance with the wavelength setting instruction provided from the processor 110: a light transmission characteristic GC1; a light transmission characteristic GC2; a light transmission characteristic GC3; . . . a light transmission characteristic GCk; . . . . Even when the semiconductor lasers 211 deteriorate or the temperature thereof changes and the spectrum of the blue light LB therefore shifts, using the optical sensor 1480 including the wavelength variable interference filter 5, which allows the wavelength of the light that passes through the wavelength variable interference filter 5 to be set again, allow accurate detection of the spectrum of the blue light LB. Specifically, the amount of light that passes through the wavelength variable interference filter 5 may be detected by sequentially switching the light transmission characteristic through the light transmission characteristics GC1, GC2, GC3, . . . GCk, . . . and adopting the maximum of the sequentially detected amounts of light. This is the reason why the optical sensor 1480 including the wavelength variable interference filter 5 is used to detect the amount of blue light BL and the amount of the fluorescence YL.

The optical filter device 172 includes an enclosure 6, and the wavelength variable interference filter 5 is provided in the enclosure 6, as shown in FIG. 6. The wavelength variable interference filter 5 is a wavelength variable Fabry-Perot etalon element and includes a light transmissive fixed substrate 51 and a movable substrate 52. The wavelength variable interference filter 5 as an integrated component formed of the fixed substrate 51 and the movable substrate 52 boned to each other via a bonding film. The wavelength variable interference filter 5 further includes a fixed reflection film 54 and a movable reflection film 55, which are so disposed as to face each other via an inter-reflection-film gap G, and an electrostatic actuator 56, which adjusts the dimension of the inter-reflection-film gap G.

The fixed substrate 51 is provided with the fixed reflection film 54, which is provided on a surface of the fixed substrate that is the surface facing the movable substrate 52, and a fixed electrode 561, which forms the electrostatic actuator 56. The fixed substrate 51 is so formed as to be thicker than the movable substrate 52, so that the fixed substrate 51 does not bend due to electrostatic attraction produced when voltage is applied to the electrostatic actuator 56 or internal stress induced by the fixed electrode 561, which will be described later.

The fixed reflection film 54 is provided in a center position of a groove provided in the fixed substrate 51. The fixed reflection film 54 is coupled to the filter control circuit 18. In the present embodiment, the fixed reflection film 54 forms along with the movable reflection film 55 a gap detection capacitor for detecting the size of the inter-reflection-film gap G. The fixed reflection film 54 is an example of a first reflection film in the present disclosure, and the movable reflection film 55 is an example of a second reflection film in the present disclosure. The fixed reflection film 54 can, for example, be a film made of a metal, such as Ag, or an electrically conductive alloy film made, for example, of an Ag alloy. A dielectric multilayer film formed of a high refraction layer made of $TiO_2$ and a low refraction layer made of $SiO_2$ may instead be used as the fixed reflection film 54. In this case, an electrically conductive metal alloy film formed on the lowermost layer or the surface layer of the dielectric multilayer film allows the fixed reflection film 54 to function as one of the electrodes of the gap detection capacitor.

The fixed electrode 561 is formed in a substantially arcuate shape that surrounds the fixed reflection film 54 in a plan view viewed in the thickness direction of the fixed substrate 51. The fixed electrode 561 is coupled to the filter control circuit 18.

The movable substrate 52 includes a movable section 521 and a holder 522, which is provided in a region outside the movable section 521 and holds the movable section 521. The movable section 521 is so formed as to be thicker than the holder 522. The movable section 521 is provided with the movable reflection film 55 and a movable electrode 562, which forms the electrostatic actuator 56.

The movable reflection film 55 is so provided in a central portion of a surface of the movable section 521 that is the surface facing the fixed substrate 51 as to face the fixed reflection film 54 via the inter-reflection-film gap G. The movable reflection film 55 is coupled to the filter control circuit 18 and forms along with the fixed reflection film 54 the gap detection capacitor. The movable reflection film 55 is a reflection film having the same configuration as that of the fixed reflection film 54 described above.

The movable electrode 562 faces the fixed electrode 561 via a predetermined gap. The movable electrode 562 is coupled to the filter control circuit 18.

The holder 522 is a diaphragm that surrounds the movable section 521 and is so formed as to be thinner than the movable section 521. The thus formed holder 522 is more likely to bend than the movable section 521 and can displace the movable section 521 toward the fixed substrate 51 by using a small magnitude of electrostatic attraction. The size of the inter-reflection-film gap G can therefore be changed with the parallelism between the fixed reflection film 54 and the movable reflection film 55 maintained. In the present embodiment, the diaphragm-shaped holder 522 is presented by way of example, but not necessarily, and beam-shaped holders arranged at equal angular intervals around a center point in the plan view may, for example, be provided.

The enclosure 6 includes a base 61 and a lid 62. The base 61 and the lid 62 are bonded to each other based, for example, on low-melting-point glass bonding using glass frit or an adhesive made of epoxy resin. The base 61 and lid 62 thus form an accommodation space in the enclosure 6, and the wavelength variable interference filter 5 is accommodated in the accommodation space.

The base 61 is formed, for example, of a thin plate on which a ceramic material is laminated and includes an accommodation section 611, which accommodates the wavelength variable interference filter 5. The wavelength variable interference filter 5 is fixed to the bottom surface of the accommodation section 611 of the base 61, for example, via a fixing material. A light passage hole 612 is provided in the bottom surface of the accommodation section 611. The light passage hole 612 is so provided as to have a region that overlaps with the fixed reflection film 54 and the movable reflection film 55 of the wavelength variable interference filter 5. A cover glass plate 613 is so bonded to the base 61 as to cover the light passage hole 612. The lid 62 is a glass planar plate and is bonded to an end surface of the base 61 that is the end surface opposite the bottom surface of the base 61.

The filter control circuit 18 includes a CPU and a drive circuit that drives the electrostatic actuator 56, none of which is shown in detail in FIG. 6. The filter control circuit 18 detects the size of the inter-reflection-film gap G in the wavelength variable interference filter 5 based on the voltage applied to the gap between the pole plates of the gap detection capacitor and adjusts the voltage applied to the electrostatic actuator 56 based on the result of the detection and the wavelength setting instruction from the processor 110 to set the size of the inter-reflection-film gap G in such a way that the light passing through the wavelength variable interference filter 5 has the wavelength indicated by the wavelength setting instruction. The electrostatic actuator is an example of a gap changer that changes the inter-reflection-film gap in accordance with the applied voltage.

Figure 10:
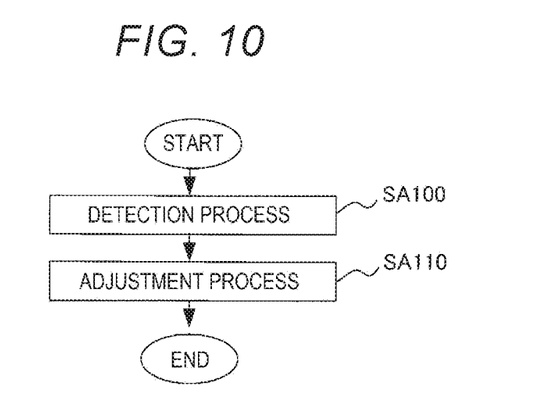
FIG. 10 is a flowchart showing the procedure of a control method carried out by a processor of the projector.

FIG. 10 is a flowchart showing the procedure of a control method carried out by the processor 110 in a prespecified cycle in accordance with the program having been stored in the storage 120. The control method includes a detection process SA100 and an adjustment process SA110, as shown in FIG. 10. In the adjustment process SA110, the processor 110 acquires the result of the detection of the amount of blue light BL and the amount of fluorescence YL detected with the optical sensor 1480. In detail, to detect the amount of blue light BL, the processor 110 sequentially sets a plurality of wavelengths within a range of the wavelength of the blue light BL, the range specified in advance in anticipation of change with time in the semiconductor lasers 211, in the wavelength variable interference filter 5 and acquires the amount of light on a set wavelength basis. The processor 110 then sets the maximum of the plurality of acquired amounts of light to be the amount of blue light BL. The same holds true for the detection of the amount of fluorescence YL.

In the adjustment process SA110, the processor 110 controls the controller 44 in such a way that the motor 47 is driven to rotate the retardation film 46. In this process, the motor 47 changes the angle of the optical axis of the retardation film 46 in such a way that the ratio between the amount of blue light BL and the amount of fluorescence YL approaches a reference value specified in advance. The processor 110, the controller 44, and the motor 47 are an example of the adjustor that adjusts the proportion of the light that reaches the phosphor layer 34 based on the result of the detection performed by the optical sensor 1480. Since adjusting the proportion of the light that reaches the phosphor layer 34 changes the ratio between the blue light BL and the fluorescence YL, it can be said that the processor 110, the controller 44, and the motor 47 form the adjustor that adjusts the ratio between the blue light BL and the fluorescence YL. The processor 110, the controller 44, and the motor 47 are an example of the adjustor that adjusts the proportion of the light that reaches the phosphor layer 34 based on the result of the detection performed by the optical sensor 1480.

The reference value of the ratio between the amount of blue light BL and the amount of fluorescence YL may be a value determined based on the amount of blue light BL and the amount of fluorescence YL detected with the optical sensor 1480 at the time of the start of use of the projector 1000A, or a design value set in the projector 1000A may be used as the reference value of the ratio between the amount of blue light BL and the amount of fluorescence YL. In the present embodiment, a reference value of the ratio between the amount of blue light BL and the amount of fluorescence YL at the time of the start of use of the projector 1000A is stored in the storage 120 in advance.

The configuration of the projector 1000A has been described.

Continuous use of the projector 1000A causes the amount of light from the semiconductor lasers 211 to decrease due to deterioration of the semiconductor lasers 211 with time even when the semiconductor lasers 211 are driven under the same conditions. When the amount of light from the semiconductor lasers 211 decreases, the amount of excitation light that excites the phosphor layer 34 decreases accordingly. A decrease in the amount of excitation light is equivalent to a decrease in the optical density of the excitation light. The optical density refers to the amount of light per unit area. A phosphor is characterized in that a decrease in the optical density of excitation light generally results in an increase in the efficiency of the conversion from the excitation light into fluorescence. Therefore, even when the amount of excitation light decreases, but when an increase in the amount of fluorescence resulting from an increase in the conversion efficiency is greater than a decrease in the amount of fluorescence resulting from the decrease in the amount of excitation light, the amount of fluorescence YL emitted from the phosphor layer 34 increases. The following description will be made with reference to the case where the amount of fluorescence YL increases, but the amount of fluorescence YL deceases in some cases. The white balance, however, deteriorates in both cases.

In the description, the amount of blue light BL and the amount of excitation light both decrease as the output of the semiconductor lasers 211 decreases. However, since the conversion efficiency of the phosphor increases, the amount of fluorescence YL relative to the amount of blue light BL increases. As a result, the ratio between the blue light BL and the fluorescence YL changes, and the white balance of the illumination light WL, which is the combination of the blue light BL and the fluorescence YL, deviates from the white balance before the change with time. Specifically since the amount of fluorescence YL with respect to the amount of blue light BL increases, the illumination light WL changes to yellowish white light.

The processor 110 carries out the control method shown in FIG. 10 when a timing specified in advance is reached.

In the detection process SA100, the processor 110 acquires the amount of blue light BL detected with the optical sensor 1480 and the amount of fluorescence YL detected with the optical sensor 1480. In the adjustment process SA110, the processor 110 compares the ratio between the amounts of light acquired in the detection process SA100 with the reference value having been stored in the storage 120. As a result of the comparison, when the difference between the newly detected ratio between the amount of blue light BL and the amount of fluorescence YL and the stored reference value is greater than a threshold specified in advance, the processor 110 rotates the retardation film 46 in such a way that the ratio between the amount of blue light BL and the amount of fluorescence YL detected with the optical sensor 1480 approaches the reference value having been stored in the storage 120.

Rotating the retardation film 46 allows adjustment of the ratio produced by the retardation film 46 between the amount of S-polarized component BLs and the amount of P-polarized component BLp. Specifically, to increase the amount of P-polarized component BLp, which forms the blue light BL, and decrease the amount of S-polarized component Bls, which forms the excitation light that produces the fluorescence YL, the amount of P-polarized component BLp may be relatively increased, and the amount of S-polarized component BLs may be relatively decreased. The amount of P-polarized component BLp, which forms the blue light that passes through the polarization separator 50A, therefore increases as compared with the case where the white balance of the illumination light WL deteriorates, so that the illumination light WL becomes more whitish, whereby the white balance of the illumination light WL can be improved.

According to the projector 1000A of the present embodiment, in which the optical sensor 1480 including the wavelength variable interference filter 5 is used to select a wavelength and detect the amount of blue light and the amount of fluorescence, the amount of blue light and the amount of fluorescence can be accurately detected even when the wavelength of the light outputted from the semiconductor lasers 211 shifts due, for example, to deterioration of the semiconductor lasers 211 with time or a change in temperature thereof. As a result, improvement in the white balance and other types of feedback can be precisely performed.

When the amount of light is detected with an optical sensor using a color filter, the optical sensor needs to be disposed on a detection target light basis. The optical sensor 1480 including the wavelength variable interference filter 5, however, allows selection of the wavelength of the light the amount of which is the detection target, whereby the single optical sensor 1480 can detect the amount of blue light and the amount of fluorescence. The configuration of the optical sensor can therefore be simplified as compared with the case where two color filters are used.

As described above, the projector 1000A according to the present embodiment can accurately detect the amount of light outputted from the laser light sources.

2. Second Embodiment

Figure 11:
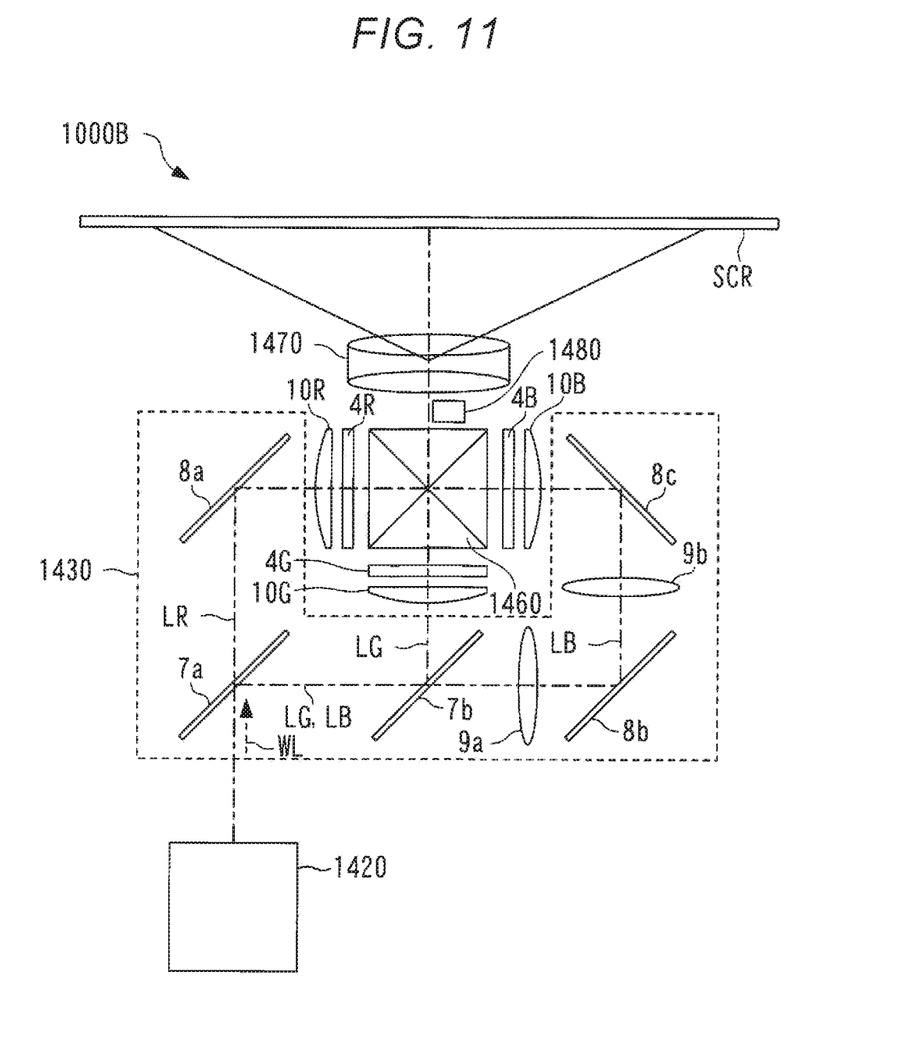
FIG. 11 shows the configuration of the color separation system provided in a projector according to a second embodiment and the position where an optical sensor is disposed in the projector.

FIG. 11 shows the configuration of the color separation system 1430 provided in a projector 1000B according to a second embodiment of the present disclosure and the position where the optical sensor 1480 is disposed in the projector 1000B. The projector 1000B differs from the projector 1000A in that the optical sensor 1480 is disposed in the vicinity of the optical path of the image light having exited out of the light combining system 1460 and traveling to the projection system 1470, as clear from the comparison between FIGS. 11 and 3. Although not shown in detail in FIG. 11, a reflector that reflects part of the image light and causes the reflected image light to enter the optical sensor 1480 is disposed in the optical path of the image light having exited out of the light combining system 1460 and traveling to the projection system 1470 in a position where the image light is not brought into focus. The reflector is disposed in a position where the image light having exited out of the light combining system 1460 and traveling to the protection system 1470 is not brought into focus and therefore does not greatly affect the image light projected via the projection system 1470 on the screen SCR. The optical path of the image light having exited out of the light combining system 1460 and traveling to the project on system 1470 is an example of a second optical path in the present disclosure. In the present embodiment, the optical sensor 1480 is disposed in the vicinity of the second optical path and may instead be disposed in the second optical path. Specifically, the optical sensor 1480 may be disposed in the optical path of the image light having exited out of the light combining system 1460 and traveling to the projection system 1470 in a position where the image light is not brought into focus. The configuration of the projector 1000B is the same as the configuration of the projector 1000A shown in FIG. 1 and is therefore not shown.

The storage 120 of the projector 1000B has stored a reference value of the ratio among the amount of blue light LB, the amount of green light LG, and the amount of red light LR at the time of the start of use of the projector 1000B. The processor 110 carries out the control method shown in FIG. 10 when a timing specified in advance is reached. In the detection process SA100 in the present embodiment, however, the processor 110 acquires the amount of blue light LB, the amount of green light LG, and the amount of red light LR detected with the optical sensor 1480. In the adjustment process SA110 in the present embodiment, the processor 110 compares the ratio among the amount of blue light LB, the amount of green light LG, and the amount of red light LR acquired in the detection process SA100 with the reference value having been stored in the storage 120. It is assumed that the difference between the newly detected ratio among the amount of blue light LB, the amount of green flight LG, and the amount of red light LR and the reference value stored in the storage 120 is greater than a threshold specified in advance. In this case, the processor 110 adjusts at least one of the transmittance provided by the light modulator 4R for red light, the transmittance provided by the light modulator 4F for green light, or the transmittance provided by the light modulator 4B for blue light in such a way that the ratio among the amount of blue light LB, the amount of green light LG, and the amount of red light LR detected with the optical sensor 1480 approaches the reference value having been stored in the storage 120.

The projector 1000B of the present embodiment also allows the single optical sensor 1480 to accurately detect the amounts of blue light, green light, and red light even when the wavelength of the light outputted from the semiconductor lasers 211 shifts due, for example, to deterioration of the semiconductor lasers 211 with time or a change in temperature thereof. As a result, the projector 1000B of the present embodiment also allows improvement in the white balance and other types of precise feedback.

3. Other Embodiments

Any of the following variations may be combined with any of the embodiments described above.

(1) In the first embodiment described above, the ratio between the amount of blue light and the amount of fluorescence is adjusted by rotation of the retardation film 46. Instead, when the light source section includes a first light source that outputs blue light having the amount according to the magnitude of first supplied electric power and a second light source that outputs fluorescence having the amount according to the magnitude of second supplied electric power, the ratio between the amount of blue light and the amount of fluorescence may be adjusted by adjustment of at least one of the first supplied electric power and the second supplied electric power.

(2) In the first embodiment described above, the amount of blue light and the amount of fluorescence are detected with the optical sensor 1480, and, in the second embodiment described above, the amounts of blue light, green light, and red light are detected with the optical sensor 1480. Instead, the amount of blue light and the amount of at least one of the green light, the red light, or the fluorescence may be detected, and the amount of at least one of the blue light, the green light, the red light, or the fluorescence may be adjusted based on the result of the detection. In short, the projector according to the present disclosure may include at least the light source section that outputs the first light that is laser light and the second light having a spectrum different from the spectrum of the first light, the photodetector that includes the wavelength variable interference filter and detects the amount of the first light and the amount of the second light, and the adjustor that adjusts the amount of the first light or the amount of the first light and the amount of the second light based on the result of the detection performed by the photodetector.

(3) In the second embodiment described above, the optical sensor 1480 may be disposed in the vicinity of each of the light modulator for red light 4R, the light modulator for green light 4G, and the light modulator for blue light 4B, and the amounts of red light LR, green light LG, and blue light LB may be detected before the red light LR, the green light LG, and the blue light LB pass through the light modulator for red light 4R, the light modulator for green light 4G, and the light modulator for blue light 4B. For example, the optical sensor 1480 that detects the amount of blue light LB may be disposed in the vicinity of the third reflection mirror 8c on a side of the third reflection mirror 8c that is the side opposite the side on which the blue light LB is incident. The third reflection mirror 8c transmits part of the blue light LB incident thereon, and the blue light LB having passed through the third reflection mirror 8c enters the optical sensor 1480. The optical sensor 1480 that detects the amount of red light LR may be disposed in the vicinity of the first reflection mirror 8a on a side of the first reflection mirror 8a that is the side opposite the side on which the red light LR is incident. The first reflection mirror 8a transmits part of the red light LR incident thereon, and the red light LR having passed through the first reflection mirror 8a enters the optical sensor 1480.

(4) A program that causes a typical computer to carry out the control program shown in FIG. 10 may be manufactured and distributed as a standalone product. Conceivable examples of a specific method for distributing the program described above may include an aspect in which a computer readable recording medium, such as a flash ROM (read only memory), on which the program described above is written is distributed and an aspect in which the program described above is distributed as a program downloaded via an electric communication line, such as the Internet.

What is claimed is:

1. A projector comprising:
   a light source section that outputs first light that is laser light and second light that is laser light and has a spectrum different from a spectrum of the first light;
   a photodetector that includes a wavelength variable interference filter and detects an amount of the first light and an amount of the second light; and
   a processor that adjusts the amount of the first light outputted by the light source section or the amounts of the first light and the second light outputted by the light source section based on a result of the detection performed by the photodetector, wherein the processor sequentially changes a light transmission characteristic of the wavelength variable interference filter to a plurality of wavelengths around a first light wavelength of the first light, and adopts a maximum of sequentially detected amounts of light around the first light wavelength as the amount of the first light, and wherein the processor sequentially changes the light transmission characteristic of the wavelength variable interference filter to a plurality of wavelengths around a second light wavelength of the second light, and adopts a maximum of sequentially detected amounts of light around the second light wavelength as the amount of the second light.

2. A projector comprising:

a light source section that outputs first light and second light;

wherein the second light contains third light having a spectrum different from a spectrum of the first light and fourth light having a spectrum different from the spectrum of the first light and the spectrum of the third light, the projector further comprising:

a light separator that separates the first light and the second light outputted from the light source section from each other and separates the separated second light into the third light and the fourth light;

a modulator that modulates the first light having been separated by the light separator, the third light having been separated by the light separator, and the fourth light having been separated by the light separator in accordance with a projection image to be projected on a projection surface;

a light combiner that combines the first light having been modulated by the modulator, the third light having been modulated by the modulator, and the fourth light having been modulated by the modulator with one another into fifth light;

a projection lens that projects the fifth light on the projection surface;

a photodetector that includes a wavelength variable interference filter and detects an amount of at least one of the first light, the second light, the third light, or the fourth light; and a processor that adjusts the amount of at least one of the first light, the second light, the third light, or the fourth light based on a result of the detection performed by the photodetector.

3. The projector according to claim 2, wherein the photodetector detects an amount of light traveling along a first optical path from the light source section to the light separator and an amount of light traveling along a second optical path from the light combiner to the projection lens.

4. The projector according to claim 2, wherein the processor adjusts the amount of first light and the amount of second light based on the result of the detection performed by the photodetector.

5. The projector according to claim 4, wherein the light source section includes a solid-state light source that outputs the first light having a first polarization axis, a retardation film that has an optical axis that intersects the first polarization axis and produces the first light having a second polarization axis that intersects the first polarization axis from the first light outputted from the solid-state light source, and a wavelength converter that contains a phosphor on which the first light is incident and produces the second light from fluorescence emitted from the phosphor, and the processor adjusts an angle between the first polarization axis and the optical axis based on the result of the detection performed by the photodetector.

6. The projector according to claim 4, wherein the light source section includes a first light source that outputs the first light having an amount according to first supplied electric power, and a second light source that outputs the second light having an amount according to second supplied electric power, and the processor adjusts a magnitude of the first supplied electric power and a magnitude of the second supplied electric power based on the result of the detection performed by the photodetector.

7. The projector according to claim 2, wherein the modulator includes a first light modulator that transmits the first light in accordance with image information representing the projection image, a third light modulator that transmits the third light in accordance with the image information representing the projection image, and a fourth light modulator that transmits the fourth light in accordance with the image information representing the projection image, and the processor adjusts transmittance at which at least one of the first light modulator, third light modulator, and the fourth light modulator transmits the corresponding light based on the result of the detection performed by the photodetector.

8. The projector according to claim 7, wherein the photodetector detects the amount of light before passing through the modulator.

9. The projector according to claim 1, wherein the wavelength variable interference filter includes a first reflection film, a second reflection film disposed with an inter-reflection-film gap interposed between the first reflection film and the second reflection film, and an actuator that changes a size of the inter-reflection-film gap according to voltage applied to the wavelength variable interference filter.

10. A method for controlling a projector that projects an image by using first light that is laser light outputted from a light source and second light that is laser light outputted from the light source and has a spectrum different from a spectrum of the first light, the method comprising:

causing an optical sensor including a wavelength variable interference filter to detect an amount of the first light and an amount of the second light; and adjusting the amount of the first light outputted by the light source section or the amounts of the first light and the second light outputted by the light source section based on a result of the detection, wherein a light transmission characteristic of the wavelength variable interference filter is sequentially changed to a plurality of wavelengths around a first light wavelength of the first light, and a maximum of sequentially detected amounts of light around the first light wavelength is adopted as the amount of the first light, and wherein the light transmission characteristic of the wavelength variable interference filter is sequentially changed to a plurality of wavelengths around a second light wavelength of the second light, and a maximum of sequentially detected amounts of light around the second light wavelength is adopted as the amount of the second light.

* * * * *